A. C. EASTWOOD & H. F. STRATTON.
CONTROL SYSTEM FOR ELECTRIC MOTORS.
APPLICATION FILED MAR. 18, 1910.
1,008,453.
Patented Nov. 14, 1911.
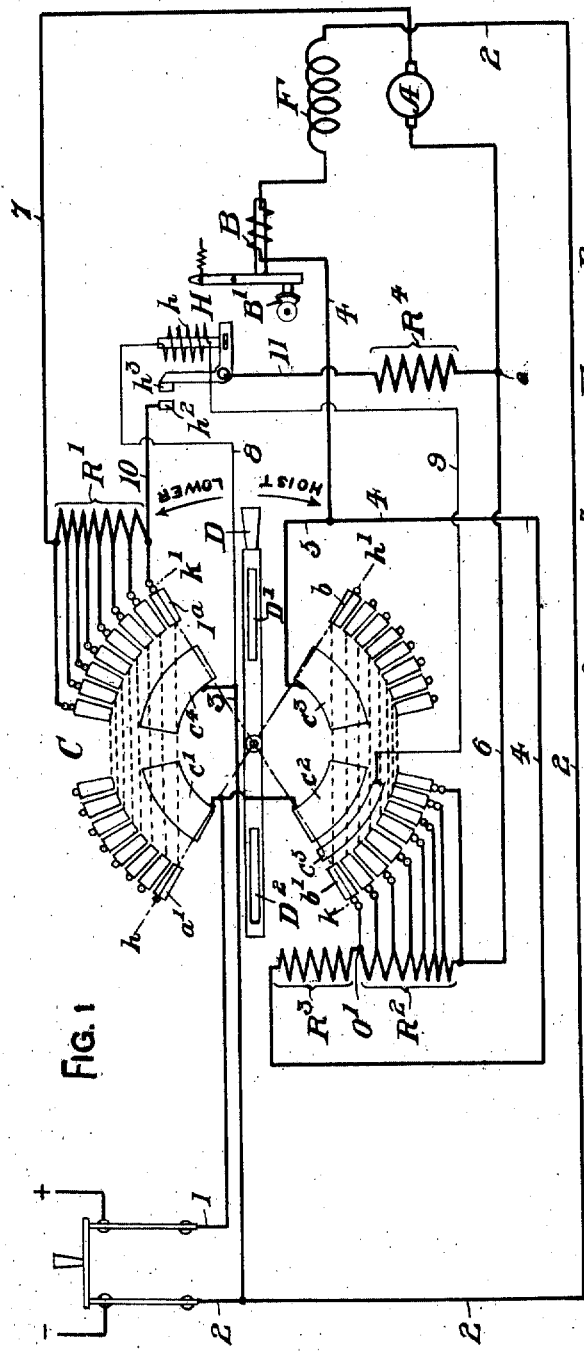

UNITED STATES PATENT OFFICE.

ARTHUR C. EASTWOOD AND HARRY F. STRATTON, OF CLEVELAND, OHIO, ASSIGNORS TO THE ELECTRIC CONTROLLER AND MANUFACTURING COMPANY, OF CLEVELAND, OHIO, A CORPORATION OF OHIO.

CONTROL SYSTEM FOR ELECTRIC MOTORS.

1,008,453.   Specification of Letters Patent.   Patented Nov. 14, 1911.

Application filed March 18, 1910. Serial No. 550,208.

*To all whom it may concern:*

Be it known that we, ARTHUR C. EASTWOOD and HARRY F. STRATTON, citizens of the United States, residing at Cleveland, in the county of Cuyahoga and State of Ohio, have invented or discovered new and useful Improvements in Control Systems for Electric Motors, of which the following is a specification.

Our invention relates to systems and methods for controlling electric motors and has particular reference to hoisting systems, though it may be used in other relations.

It is the object of our invention to provide means for obtaining slow speeds in lowering loads driven by a motor having a series field winding, but connected while lowering with its said field separately excited.

Referring to the accompanying drawings, Figure 1 is a diagram showing one form of our control system with the master switch in its off-position; Fig. 2, a diagram of the motor circuits when the master-switch is in its first hoisting position; Fig. 3, a diagram of the motor circuits when the master-switch is in its first lowering position; and Fig. 4, a diagram similar to Fig. 3 showing the motor circuits when the master-switch is in its last or full-on position.

On the drawings, A represents the armature, F its series field, B the winding of the magnetic brake B', and C the master-switch or controller having a pair of brushes and a number of controller contacts for controlling the resistances R' and R² in an evident manner. The connection of the various conventionally shown elements will be clearly understood in the description of the operation following.

With the master-switch arm D on the first hoisting position shown by the line $hh'$, the motor circuit is as follows: from the positive through the wire 1, the contact $c'$, the brush D², the contacts $a'$ and 1ª, the resistance R', the wire 7, the armature A, the wire 6, the resistance R², the contacts $b'$ and $b$, the brush D', the contact $c^3$, the wires 5 and 4, the winding B of the brake B', the field F, and the wire 2 to the negative. The current in this circuit starts the motor slowly in the hoisting direction. As the arm D is moved farther toward the full on position, the resistances are gradually cut out in an obvious manner until finally the motor is connected directly across the line. As the arm D is thus moved the motor speed is gradually increased. In all the positions of the arm D the brake winding B receives the full motor current, which holds the brake B' released in a well known manner. When it is desired to stop the movement of the load the arm D is moved to the off position. The resistances R' and R² are gradually inserted in motor circuit, which is finally opened at the off position, cutting off the source of current supply. The action of gravity stops the load, and since no current now flows in the brake winding, it sets and prevents the load descending. When it is desired to lower the load the controller arm is moved to the first position lowering shown by the line $kk'$.

The operating solenoid $h$ of switch H is energized by a current whose circuit is as follows: from the positive through the wire 1, the contact $c^2$, the brush D², the contact $c^5$, the wire 9, the magnetizing winding $h$ and the wires 8, 3, and 2 to the negative. This current causes the switch H to close its contacts $h^2$, $h^3$. The motor circuits are now as follows: from the positive through the wire 1, the contact $c^2$, the brush D², and the contact $b'$, and the point O', where the current divides, one branch passing through the resistance R³, the wire 4, the brake winding B, the field F, and the wire 2 to the negative; the other branch which begins at the point O' passing through the resistance R² and the wire 6 to the point O, where it divides, one part passing through the armature A in the opposite direction to that in hoisting, the wire 7, the resistance R', the contact 1ª, the brush D', the contact $c^4$, and the wires 3 and 2 to the negative; and the other part starting at the point O, and passing through the resistance R⁴, the wire 11, the contacts $h^3$ and $h^{2\cdot}$ of the switch H, the wire 10, the contact 1ª, the brush D', the contact $c^4$, and the wires 3 and 2 to the negative. The simplified motor circuits just traced are shown in Fig. 3.

It will be noticed that there are now two parallel circuits established through the motor, one of these containing the resistance R³, the brake winding B, and the series field F; the other including the resistance R² and a parallel circuit containing the armature in series with the resistance R' as one branch, and the resistance R⁴ and the switch H as the other. The resistance R³ is so proportioned that it will allow approximately full load current to flow through the series field F, and the motor field is, therefore, fully energized. The armature A and the resistance R' in the armature circuit are shunted by the resistance R⁴ through the switch H. Therefore, the total current passing in the armature branch through the resistance R² is not allowed to pass through the armature of the motor, and it, therefore, will operate at a very slow speed, depending on the value of the resistance R⁴. Also, when a heavy load drives the motor, as a dynamo, this shunt produces slow speed. By this means a low speed is obtained either with a light load or a heavy load in lowering.

In order to increase the speed, the arm D of the controller C is moved toward the full on position, gradually cutting the resistance R' out of the armature circuit and inserting it in the shunt; and at the same time cutting the resistance R² out of the armature branch of the parallel circuit and inserting it in the field branch. This increases the speed of the motor from three causes: first, by decreasing the amount of resistance in series with the armature branch; second, by weakening the field by inserting resistance in the field branch; and third, by increasing the resistance in the armature shunt. When the controller arm D reaches the last point, all of the resistance R' is cut out of the armature circuit and inserted in the shunt, and there are then three parallel paths across the supply mains; one through the resistance R² and R³, and brake and series field windings; a second through the armature A; and, unless the contact c⁵ is shortened as now to be described, a third through the resistance R⁴, the switch H, and the resistance R'. It is not necessary that the current through the resistance R⁴ be used on the final controller point since the armature is connected directly across the line; and by making the contact c⁵ so short as to make the brush D² leave the contact c⁵ on the controller just before the last point b⁸ of the controller C is reached, the switch H will be caused to open, thus preventing the loss of current through this path of the circuit. The simplified motor connections for the final lowering position are shown in Fig. 4. When it is desired to slow down or stop the load, the arm D of the controller C is moved toward the off position, shown on Fig. 1. As soon as the brush D² makes contact with the contact c⁵ the switch H again closes, and the slowing down of the speed is accomplished under the shunted armature condition as described above, the current through the series field varying as the resistance R² is cut out of its circuit. As the arm approaches the contacts 1ª and b' the speed of the motor becomes very slow, and when the controller handle is brought to the off position the current through the motor is interrupted, and the series brake B sets, bringing the motor to rest and holding the load.

We do not limit our invention to series wound motors or brakes, nor to any definite type of controller, nor to other details and combinations thereof unless required by the prior art or by language in the claims which permits of no other construction.

We claim—

1. In an electric control system, a motor having armature and field windings, means connecting the armature and field windings in parallel paths, a resistance means for placing it in each path, and a circuit of low resistance, shunted around the armature winding.

2. In an electric control system, a motor having armature and field windings, means connecting the armature and field windings in parallel paths, a resistance means for placing it in each path, a circuit of low resistance, shunted around the armature winding, and means for subsequently opening said shunt circuit.

3. In an electric control system, a motor having armature and field windings, means connecting the armature and field windings in parallel paths, a resistance in each path, a circuit of low resistance arranged to include the armature winding and its resistance in a shunt, and means for increasing the resistance in the shunt circuit as the controller is moved toward the full on position.

4. In an electric control system, a motor having an armature winding, means connecting the armature winding across the supply mains, a variable resistance in series with the armature winding, a circuit of low resistance paralleling the armature winding and said variable resistance, and means by which the variable resistance may be simultaneously cut out of the armature circuit and cut into the parallel circuit.

5. In an electric control system, a motor having an armature winding, means connecting the armature winding across the supply mains, a variable resistance in series with the armature winding, a circuit of low resistance paralleling the armature winding and said variable resistance, means by which the variable resistance may be simultaneously cut out of the armature circuit and cut into the parallel circuit, and means for opening said parallel circuit.

6. The method of controlling an electric motor which consists in connecting the armature and field in parallel paths, each containing a resistance, closing a shunt circuit around the armature for starting the motor and increasing the speed thereof, increasing the resistance in the field path, decreasing the resistance in the armature path, and increasing the resistance in the shunt circuit.

7. In an electric control system, a motor having an armature winding, means connecting the armature winding across the supply mains, a circuit of low resistance in parallel with the armature winding, a resistance in the armature branch of the parallel circuits, and means for decreasing the said resistance and for inserting resistance in the parallel circuit.

8. In an electric control system, a motor having armature and field windings, means connecting the armature and field windings in series for operating the motor in one direction, and for operating it in the other direction means connecting the armature and field windings in parallel paths, a resistance in each path, a circuit of low resistance shunted around the armature winding, and means for opening the shunt circuit.

Signed at Cleveland, Ohio, this 16th day of March, 1910.

ARTHUR C. EASTWOOD.
H. F. STRATTON.

Witnesses:
J. H. HALL,
H. M. DIEMER.

Copies of this patent may be obtained for five cents each, by addressing the "Commissioner of Patents, Washington, D. C."